Patented June 15, 1943

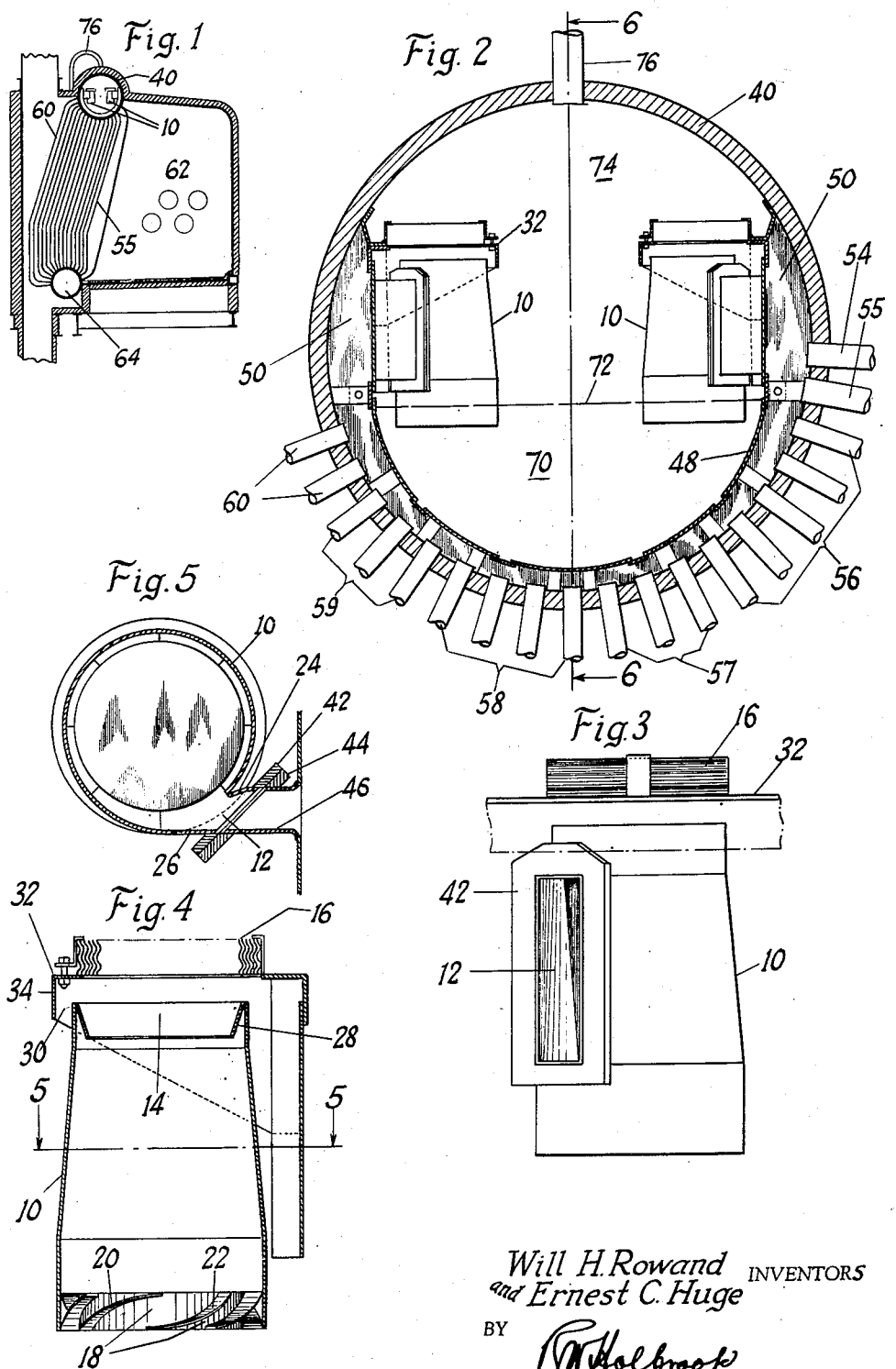

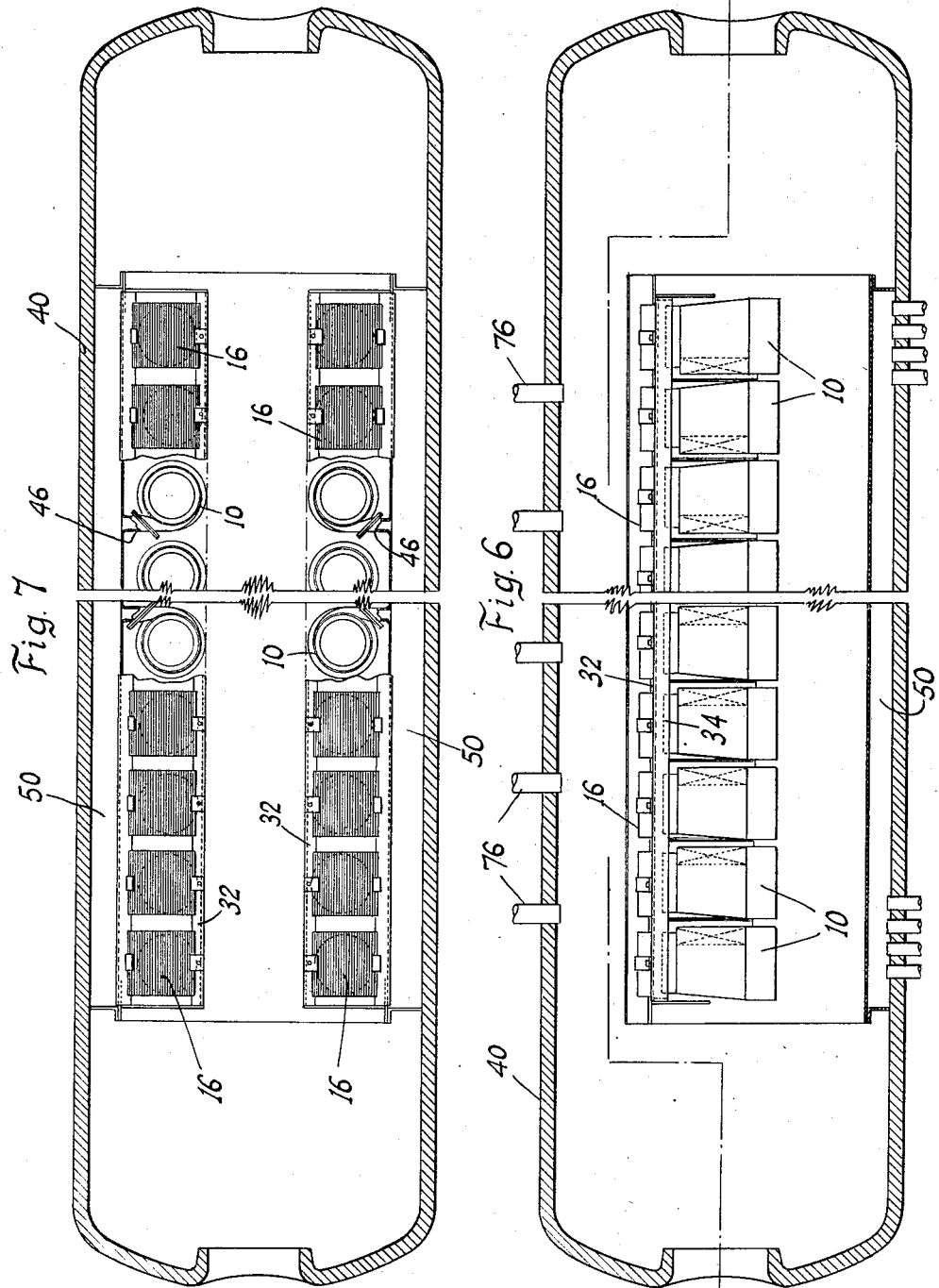

2,321,628

UNITED STATES PATENT OFFICE 2,321,628

FLUID SEPARATOR

Will H. Rowand, Plainfield, N. J., and Ernest C. Huge, Barberton, Ohio, assignors to The Babcock & Wilcox Company, Newark, N. J., a corporation of New Jersey Application July 6, 1940, Serial No. 344,200

1 Claim. (Cl. 183—83)

This invention relates to means for separating fluids of different densities, and it is more particularly concerned with centrifugal means for separating water and steam.

One embodiment of the invention involves a substantially circular whirl chamber of a conformation similar to that of a truncated cone. This chamber is so arranged that its top is its smaller end, and into this end a mixture of steam and water is discharged eccentrically so as to set up a whirling motion within the chamber. As a consequence, steam is separated from the water, the latter being given an increased downward component toward a restricted and submerged water outlet at the lower end of the whirl chamber. The separated steam passes from the chamber through an upper outlet. An object of the invention, accomplished by this embodiment, is to provide steam and water separating means in which the water is given an increased component towards the restricted water outlet with a minimum loss of velocity head due to friction.

The invention also contemplates the use of the illustrative separator in a high pressure steam generator to improve circulation and to enable the generator to operate at higher drum water levels while still supplying dry steam.

The cyclone separator functions mainly as the result of centrifugal forces set up when a previously developed moving stream of a mixture of liquid and vapor is directed in a curvilinear path. The centrifugal force is a function of angular velocity which in turn is a function of the entrance velocity.

As the velocity of circulation in a natural circulation boiler is the result of density differentials, and as these differentials become less as the pressure approaches the critical pressure, it is important that whatever velocity is developed be used most effectively or efficiently.

It is a purpose of this invention to more efficiently utilize the circulating energy of the mixture in a steam boiler and to not only aid in a more effective removal of heat by circulating more water but to further utilize the circulation energy in separating the steam from the mixture. The invention will be described with reference to a preferred embodiment, and other objects of the invention will appear as the description proceeds.

A preferred embodiment is shown in the accompanying drawings in which similar parts are referred to by the reference characters of the description.

In the drawings:

Fig. 1 is a vertical section of a steam generator in connection with which the invention is employed;

Fig. 2 is a vertical transverse section through the steam and water drum of the Fig. 1 generator;

Fig. 3 is an elevation of the illustrative separator particularly showing the inlet for a mixture of steam and water;

Fig. 4 is a vertical section of the separator indicated in Fig. 3;

Fig. 5 is a horizontal section of the separator taken on the section line 5—5 of Fig. 4;

Fig. 6 is a vertical section of the steam and water drum showing the arrangement of separators; and Fig. 7 is a horizontal section of the drum, showing a plan of the separators.

The illustrative separator includes a substantially circular whirl chamber 10 having an eccentric inlet 12 through which a mixture of steam and water is discharged at high velocity so as to set up a whirling motion of the fluid within the chamber.

Steam is separated from the water within the whirl chamber, the former passing upwardly through a central steam outlet 14 above which there is a scrubber, or multiple plate steam and water separator 16. The separated water is discharged downwardly and outwardly of the whirl chamber through circumferentially arranged outlets 18 between successive vanes such as 20 and 22.

A part of the whirl chamber is tapered and has the form of the surface of a truncated cone with its smaller end at its top and this causes the fluid discharged through the inlet 12 to have an increased component downwardly, or toward the outlets 18 for the separated water.

As shown, the steam and water inlet is of a vertical extent substantially equal to that of the tapered portion of the whirl chamber, and, furthermore, as shown in Fig. 5 the upright walls 24 and 26 of the inlet are so related to the tapered portion of the whirl chamber as to form therewith a conical scroll. The incoming mixture of steam and water is thus so directed that it will set up a high velocity whirling motion within the whirl chamber. Also, the wall 24 of the inlet, gradually merging, as it does, into the substantially circular wall of the whirl chamber is inclined so as to initially impart an increased downward component to the incoming fluid.

The outlets 18 for separated water are limited to an annular zone near the perimeter of the bottom of the whirl chamber and within this zone there is a bottom plate.

When the incoming stream is constrained by the cylindrical walls of the whirl chamber to follow a curvilinear path, the steam and the water constituents are effected differentially by the centrifugal force and by gravity. As the mass of the liquid is greater than the vapor, it will displace the vapor along the wall of the chamber, and will also be affected by gravity so as to displace the vapor in the lower portion of the cylinder.

If the mixture enters the chamber horizontally, impact angularly of the cylinder walls will result in unrestrained force components in three directions; tangential, downward in direction of gravity, and upward.

The upward component will tend to cause the water to rise above the level of the entrance but this is counteracted by gravity.

It is an aim of the invention to so direct the incoming stream with an initial downward inclination that its inherent downward force component will be sufficient to prevent any upward flow of water on the cylinder walls at the point of initial impact. The downward flow will then be initially set up with most effective low resistance flow conditions.

It is desirable to arrange the entrance conduit so that the stream will enter the chamber as a band of substantially uniform section, but also so that the entering stream before entrance into the conical chamber and deflection by the walls thereof, will be directed in a slightly downward direction so that its downward component coupled with the inclined whirl chamber walls will prevent any upward spread of the deflected water, and the entire liquid stream will continue in a helical flow path.

In the operation of the illustrative separator, it is important that the separated steam be as free from water as possible, and to promote this condition the whirl chamber is provided at its top with the annular member 28 in the shape of the frustum of a cone and with its larger upper end secured to the top of the whirl chamber and around the steam outlet 14. This construction serves to interrupt the upward progress of any water and to direct the water back into the whirl chamber.

The velocity of steam between the whirl chamber and the scrubber is decreased, and the scrubber is given a more uniform loading over its flow area by the provision of an opening 30 between the scrubber and the steam outlet. Fig. 5 shows this opening in the form of a passage between cap 32 and a downwardly extending flange 34 of the cap.

The rim permits the separator to be operated at a capacity with an exit velocity exceeding the normal carrying velocity of the mixture. The droplets of water carried under these conditions are discharged under the rim of the cap where they collect and fall into the water in the drum.

The cap 30 may be constructed to provide a ledge or shelf continuing over a plurality of separators and providing a support for a number of the scrubbers 16, as indicated in Figs. 6 and 7.

A number of the illustrative separators may be secured within the steam and water drum 40, and for this purpose, the inlet structure of each separator is provided with a heavy flange 42 which is secured to a similarly shaped flange 44 at the outer end of each of the nozzles 46 secured to the inner wall 48 of the drum chamber 50. This wall is secured within the drum in a position indicated in Fig. 2, completely separating the chamber 50 from the remainder of the interior of the drum, except for the communications afforded by the illustrative separators. This wall may also afford a support for the cap structure 32.

Steam and water mixtures are discharged into the drum 50 by the steam generating tubes 54—60 which are indicated in Fig. 1 as being exposed to the high temperatures of the furnace 62. This figure also shows the water drum 64 as being directly connected to the drum 40 by the steam generating tubes 54—60, a natural circulation of fluid being provided by downcomers which are in communication with the water space 70 of the drum 40, and the water drum 64.

Under normal operating conditions the water level 72 within the drum 40 is above the water outlets of the separators so that the water outlets are submerged. However, the downward component of the velocity of the water within the separators serves to discharge that water from the separators even at water levels considerably above that indicated at 72.

Steam from the illustrative separators passes into the steam space 74 of the drum and then through the steam off-taken connection 76, to a superheater, or to a point of use.

What is claimed is:

In a steam and water separator adapted for use in a steam and water drum under high pressure, means forming an upright frusto-conical whirl chamber into which a steam and water mixture with a high water to steam weight ratio is discharged so that it will have a whirling motion within the whirl chamber, means forming a separate steam opening communicating with the top of the whirl chamber, means forming a separated water outlet at the bottom of the whirl chamber and in a circumferential zone adjacent the maximum perimeter of the whirl chamber, steam and water inlet means secured to and associated with the smaller end of the whirl chamber and having its outer wall forming a surface in the nature of a helical scroll directed downwardly toward the whirl chamber outlet for separated water, the outer wall of the inlet including upright elements in successive radial planes with successive elements having their upper ends displaced progressively more toward the longitudinal axis of the whirl chamber until an element merges with an element of the frusto-conical surface of the whirl chamber.

WILL H. ROWAND.
ERNEST C. HUGE.